United States Patent [19]

Nakada et al.

[11] Patent Number: 5,758,189
[45] Date of Patent: May 26, 1998

[54] SYSTEM FOR CHANGING PERIOD TO EXAMINE EXTERNAL STORAGE UNIT FOR STORAGE MEDIUM BEING LOADED BASED ON STATE OF USE OF INPUT DEVICE

[75] Inventors: Masahiro Nakada; Hiroshi Suzuki, both of Kawasaki, Japan

[73] Assignee: Fujitsu Limited, Kawasaki, Japan

[21] Appl. No.: 423,465

[22] Filed: Apr. 19, 1995

[30] Foreign Application Priority Data

Jun. 23, 1994 [JP] Japan .................................. 6-141606

[51] Int. Cl.$^6$ .................................. G06F 13/22
[52] U.S. Cl. .......................... 395/866; 395/835; 395/864; 364/241; 364/251.4
[58] Field of Search ..................... 395/727, 856, 395/835, 837, 838, 275, 828, 839, 864, 866, 882, 867; 364/241, 251.4

[56] References Cited

U.S. PATENT DOCUMENTS

| | | | |
|---|---|---|---|
| 3,665,407 | 5/1972 | Gallagher et al. | 470/70 |
| 4,172,289 | 10/1979 | Struger et al. | 395/835 |
| 4,193,113 | 3/1980 | Cykowski | 364/200 |
| 4,482,855 | 11/1984 | Amano et al. | 166/118 |
| 4,545,013 | 10/1985 | Lyon et al. | 371/20.1 |
| 4,598,363 | 7/1986 | Clark et al. | 395/250 |
| 4,806,931 | 2/1989 | Nelson | 340/907 |
| 5,099,449 | 3/1992 | Dombrosky et al. | 395/800 |
| 5,173,892 | 12/1992 | Yamada | 369/53 |
| 5,201,053 | 4/1993 | Benhase et al. | 395/289 |
| 5,239,652 | 8/1993 | Seibert et al. | 395/750 |
| 5,297,258 | 3/1994 | Hale et al. | 395/441 |
| 5,325,532 | 6/1994 | Crosswy et al. | 395/700 |
| 5,414,858 | 5/1995 | Hoffman et al. | 395/868 |
| 5,450,609 | 9/1995 | Schultz et al. | 395/800 |
| 5,461,266 | 10/1995 | Koreeda et al. | 307/125 |
| 5,479,611 | 12/1995 | Oyama | 395/185.01 |
| 5,537,566 | 7/1996 | Konno et al. | 395/441 |
| 5,566,351 | 10/1996 | Crittenden et al. | 395/867 |

FOREIGN PATENT DOCUMENTS

| | | |
|---|---|---|
| 489227 | 6/1992 | European Pat. Off. . |
| 449758 | 7/1992 | European Pat. Off. . |
| 547844 | 6/1993 | European Pat. Off. . |
| 59-20070 | 2/1984 | Japan . |
| 1166239 | 6/1989 | Japan . |
| 392922 | 4/1991 | Japan . |

OTHER PUBLICATIONS

"Dynamic Program Priority In Multi-Tasking Systems," *IBM Technical Disclosure Bulletin*, vol. 29, No. 3, Aug. 1986.

*Primary Examiner*—Thomas C. Lee
*Assistant Examiner*—Ki S. Kim
*Attorney, Agent, or Firm*—Greer, Burns & Crain, Ltd.

[57] ABSTRACT

A host apparatus has examination-period changing means for monitoring the state of use of a data input unit, such as how frequently a user is using the keys on a keyboard, and for changing, in dependence upon the monitored state of use, a period at which a check is performed to determine whether a recording medium has been loaded in an external storage unit and medium-loading monitoring means for performing the check, at the checking period decided. The examination-period changing means lengthens the checking period if frequency of use of the data input unit is high and shortens the checking period if frequency of use is low. In a case where a plurality of external storage units have been connected to the computer system, the checking of medium loading is executed only with regard to external storage units in which a recording medium has not been loaded. The host apparatus executes predetermined processing upon detecting that a recording medium has been loaded in an external storage unit.

9 Claims, 11 Drawing Sheets

SYSTEM FOR CHANGING PERIOD TO EXAMINE EXTERNAL STORAGE UNIT FOR STORAGE MEDIUM BEING LOADED BASED ON STATE OF USE OF INPUT DEVICE

BACKGROUND OF THE INVENTION

This invention relates to a computer system and a method of controlling the same. More particularly, the invention relates to a computer system having an external storage unit in which a storage medium can be loaded and unloaded, as well as to a method of controlling this computer system.

A known computer system has an interchangeable-type external storage unit in which a recording medium (storage medium) such as a floppy disk or optical disk can be loaded and unloaded, a host apparatus which executes prescribed processing on the basis of software that has been recorded on the recording medium, and a data input unit such as a keyboard or mouse for entering data and commands, which are necessary for processing, into the host apparatus, wherein the host apparatus executes predetermined processing upon detecting that the recording medium has been loaded in the external storage unit.

In a computer system of this kind, an OS such as MS-DOS (Microsoft Corporation's disk operating system) often is installed in the host. Such an OS cannot sense the loading of the recording medium if the medium is merely loaded in the interchangeable external storage unit. If loading cannot be sensed, then the software on the recording medium cannot be utilized.

Accordingly, after the recording medium is loaded, the user himself notifies the host directly or indirectly of the name of the logical drive in which the recording medium has been loaded and designates the program desired to be run or the name of the file utilized. For example, in a case where a program Prog is desired to be executed after the recording medium is loaded in a logical drive D, the following is entered using a keyboard:

D:

Prog

As a result, the host reads the prescribed program Prog out of the recording medium loaded in the logical drive D and executes the program.

In a method available for recognizing a drive in which a recording medium has been loaded, the host recognizes the loading of the recording medium automatically by polling. More specifically, the host issues a command to the external storage unit at fixed time intervals to determine whether the medium has been loaded or not. The host recognizes loading of the recording medium automatically by referring to the response to the command. For example, the host issues a command (e.g., a directory command) to the interchangeable external storage unit at prescribed times and judges that the recording medium has not been loaded if a file list is not received. If a file list is received, then the host judges that the recording medium has been loaded. In this case, by registering in advance a program that is to be executed, the host will execute the program. By adopting this expedient, a user need only load the recording medium in the external storage unit. The prescribed program will be executed automatically without any further action being taken by user.

The method through which the user himself gives direct or indirect notification of loading of the recording medium requires operation of the keyboard and therefore is not user friendly. Further, in a case where the name of the logical drive managed by the OS and the name of a physical drive are not the same, a command for notifying of loading of the recording medium cannot be issued unless the user is aware of the correspondence between the physical drive and logical drive.

Further, in the automatic recognition method that relies upon polling, the command for checking to determine whether the medium has been loaded or not is issued to the external storage unit at fixed time intervals. Consequently, in a multitask environment or in a case where a task imposing a heavy load upon a CPU is being executed, there is a decline in the throughput of the overall system. If the aforementioned fixed time interval is lengthened, the decline in throughput can be mitigated but then more time will be needed to recognize loading of the recording medium.

SUMMARY OF THE INVENTION

Accordingly, an object of the present invention is to provide a computer system and a method of controlling the same in which loading of a storage medium is recognized automatically and a decline in the throughput of the overall system can be kept as small as possible.

Another object of the present invention is to provide a computer system and a method of controlling the same in which loading of a storage medium can be recognized promptly without any decline in throughput.

A further object of the present invention is to provide a computer system and a method of controlling the same in which it is determined whether or not a storage medium has been loaded in an external storage unit by checking at comparatively long time intervals under ordinary conditions, but the time intervals are shortened when the load on a CPU is small or the likelihood that the storage medium has been loaded is high, thereby making it possible to prevent a decline in the throughput of the overall system.

In accordance with the present invention, the foregoing objects are attained by providing a method of controlling a computer system including the steps of monitoring a state of use of an input unit, and changing, in conformity with the state of use of the input unit, the period at which an examination is performed to determine whether a storage medium has been loaded in an external storage unit.

Further, according to the present invention, the foregoing objects are attained by providing a method of controlling a computer system including the steps of providing means for registering a loading sound produced when a storage medium is loaded in an external storage unit and a microphone, judging whether a sound detected by the microphone is the loading sound by comparing the detected sound with the registered sound, and if the detected sound is judged to be the loading sound, shortening the period at which an examination is performed to determine whether a storage medium has been loaded in the external storage unit.

Further, according to the present invention, the foregoing objects are attained by providing a method of controlling a computer system including the steps of monitoring whether a predetermined operation has been performed by an input unit, and if the predetermined operation has been performed, shortening a period at which an examination is performed to determine whether a storage medium has been loaded in an external storage unit.

Further, according to the present invention, the foregoing objects are attained by providing a method of controlling a computer system including the steps of shortening, at system start-up, a period at which an examination is performed to determine whether a storage medium has been loaded in an external storage unit, and lengthening, upon elapse of a prescribed time from system start-up, the period at which the examination is performed to determine whether the storage medium has been loaded in the external storage unit.

Further, according to the present invention, the foregoing objects are attained by providing a method of controlling a computer system including the steps of monitoring state of use of a host apparatus, deciding, on the basis of the state of use of the host apparatus, an examination period at which an examination is performed to determine whether a storage medium has been loaded in an external storage unit, and performing, at the examination period decided, the examination to determine whether the storage medium has been loaded in the external storage unit.

Further, according to the present invention, the foregoing objects are attained by providing a computer system having monitoring means for monitoring state of use of an input unit, and examination-period changing means for changing, in conformity with the state of use of the input unit, an examination period at which an examination is performed to determine whether a storage medium has been loaded in an external storage unit.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS (A) Overview of the invention

Figure 1:
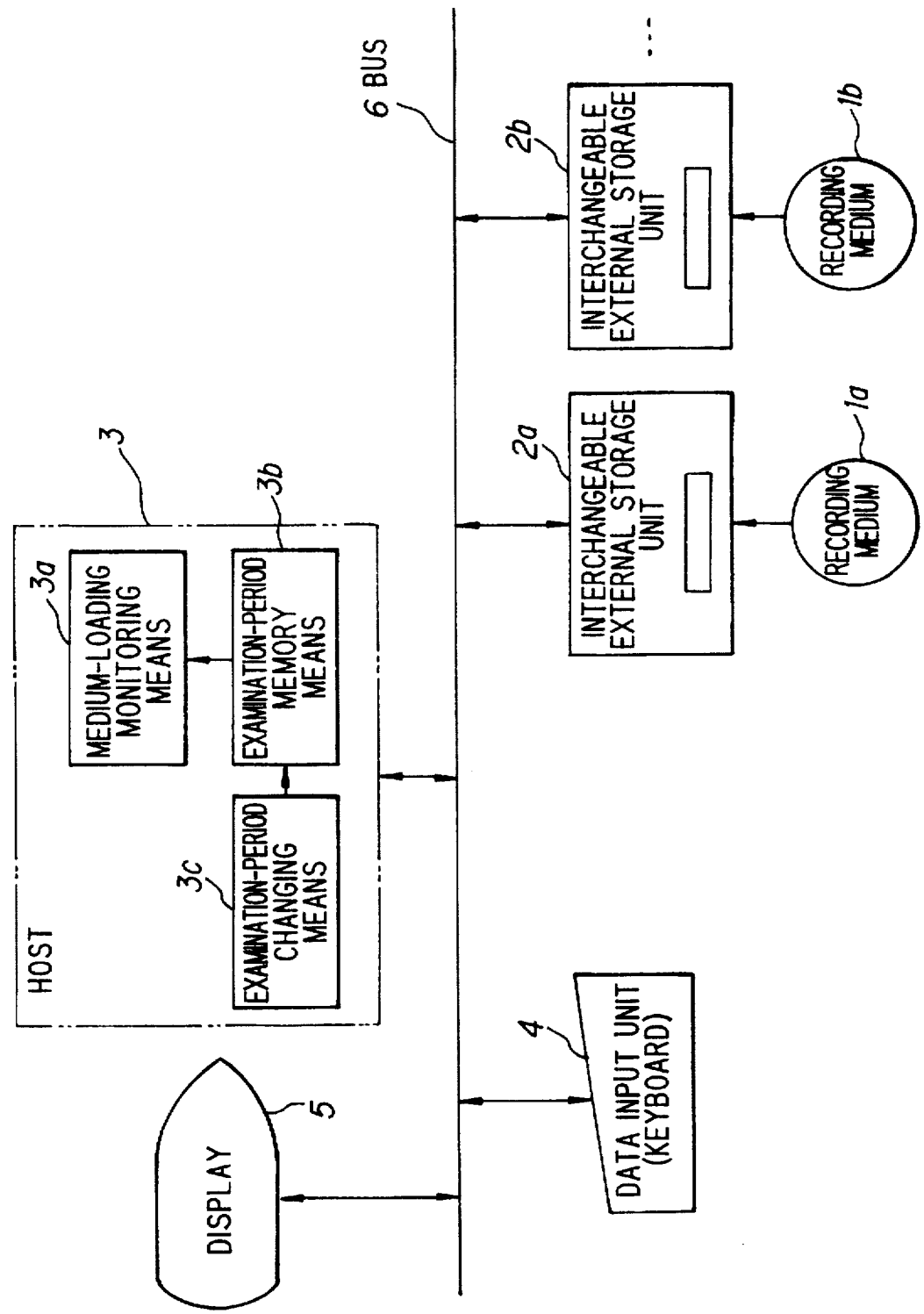
FIG. 1 is a diagram for describing an overview of the present invention.

FIG. 1 is a diagram for describing an overview of the present invention.

Shown in FIG. 1 are interchangeable recording media 1a, 1b, . . . such as optical disks or floppy disks, interchangeable external storage units 2a, 2b, . . . such as optical disk drives or floppy disk drives, a host apparatus 3, a data input unit 4 such as a keyboard, a display unit 5 and a bus 6. The host apparatus 3 includes medium-loading monitoring means 3a for performing monitoring at a prescribed monitoring time interval (examination period) to determine whether a recording medium has been loaded in an external storage unit, examination-period memory means 3b for storing the examination period, and examination-period changing means 3c for changing the examination period.

The examination-period changing means 3c monitors the state of use, such as the frequency of key operation, of the data input unit 4, and changes the examination period, at which it is determined whether a recording medium has been loaded in an external storage unit, in conformity with the aforementioned state of use. The medium-loading monitoring means performs an examination, at the examination period, to determine whether a recording medium has been loaded in an external storage unit. In this case, the examination-period changing means 3c lengthens the examination period if frequency of use is high and shortens the examination period if frequency of use is low. In a case where a plurality of external storage units 2a, 2b, . . . have been connected to the computer system, the examination for loading of the medium is executed solely with regard to external storage units in which a recording medium has not been loaded.

When the user is operating the data input unit to frequently enter data or commands, there is little likelihood that the user will insert a recording medium in an external storage unit and, moreover, the load upon the host at this time is large. On the other hand, when the data input unit is not being used, the likelihood that the user will insert a recording medium in an external storage unit is high. Moreover, the load upon the host at this time is small. Accordingly, in a situation where use of the data input unit is frequent, the examination period is lengthened to alleviate the load upon the host. In a situation where use of the data input unit is infrequent, the examination period is shortened to monitor loading of the recording medium more frequently. If this arrangement is adopted, loading of the recording medium can be discriminated promptly without reducing the throughput of the system.

Further, provided are a microphone and means for registering a loading sound produced when the recording media 1a, 1b, . . . are loaded in the external storage units 2a, 2b, . . . . The examination-period changing means 3c judges whether a sound detected by the microphone is the loading sound by comparing the detected sound with the registered sound. If the detected sound is judged to be the loading sound, the changing means 3c shortens the examination period. Alternatively, the examination-period changing means 3c performs monitoring to determine whether a predetermined operation has been performed by the data input unit 4. If the predetermined operation has been performed, the changing means 3c shortens the examination period. In another option, the examination-period changing means 3c shortens the examination period at start-up of the system. Upon elapse of a prescribed time from system start-up, the changing means 3 lengthens the examination period. If any of these arrangements is adopted, the examination period can be shortened to allow prompt discrimination of loading of a recording medium when the likelihood that a recording medium has been loaded is high. This also makes it possible to prevent a decline in system throughput.

Furthermore, the examination-period changing means 3c monitors the state of use (load rate) of the host apparatus and decides, on the basis of the state of use, the period at which an examination is performed to determine whether a storage medium has been loaded in an external storage unit. For example, the examination period is shortened if the CPU load rate of the host is low and lengthened if the CPU load rate of the host is high. This makes it possible to prevent is decline in the throughput of the overall system (B) First embodiment (a) Computer system configuration FIG. 2 is diagram illustrating the configuration of a computer system having an optical disk drive (interchangeable external storage unit) in which an optical disk medium serves as the recording medium.

The system includes an optical disk 11), an optical disk drive 21, a host system 31 (the main body of a computer), and a data input unit (control panel) 41, which has a keyboard 41a and a mouse 41b. Numeral 51 denotes a display unit such as a CRT or liquid-crystal display, and 61 represents a printer. A hard disk drive and a floppy disk device are provided as needed, though these are not shown. Two or more optical disk drives are connected to the system.

Figure 2:
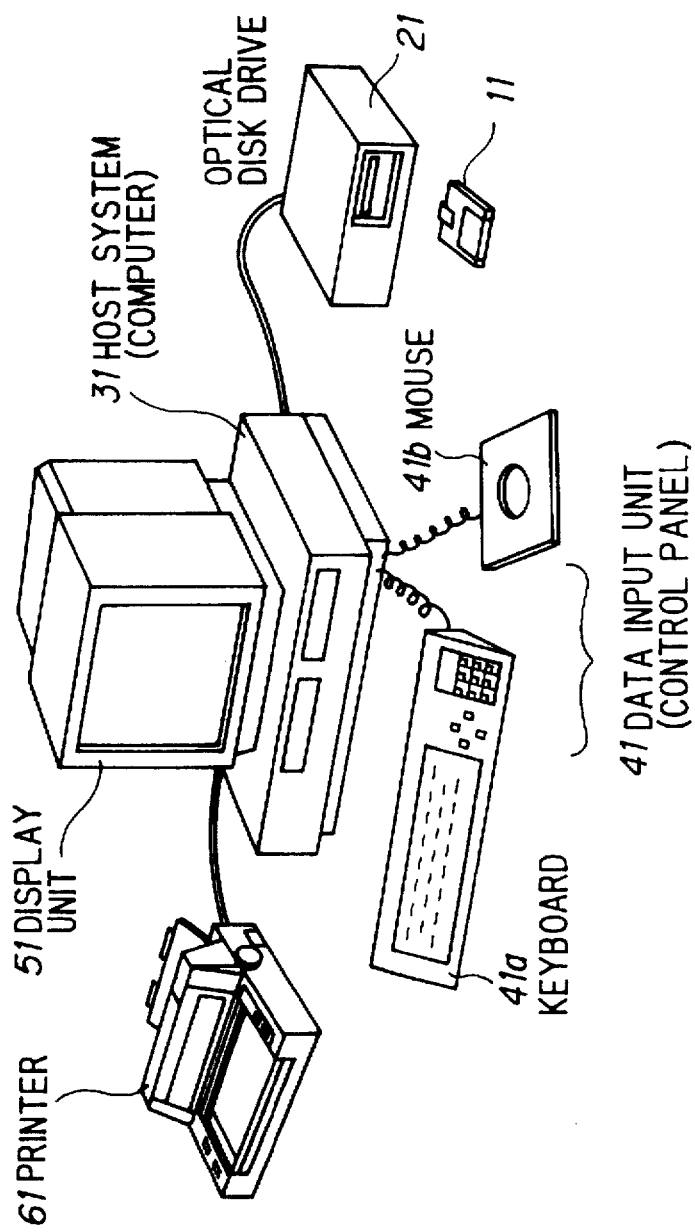
FIG. 2 is a diagram showing the system configuration.
Figure 3:
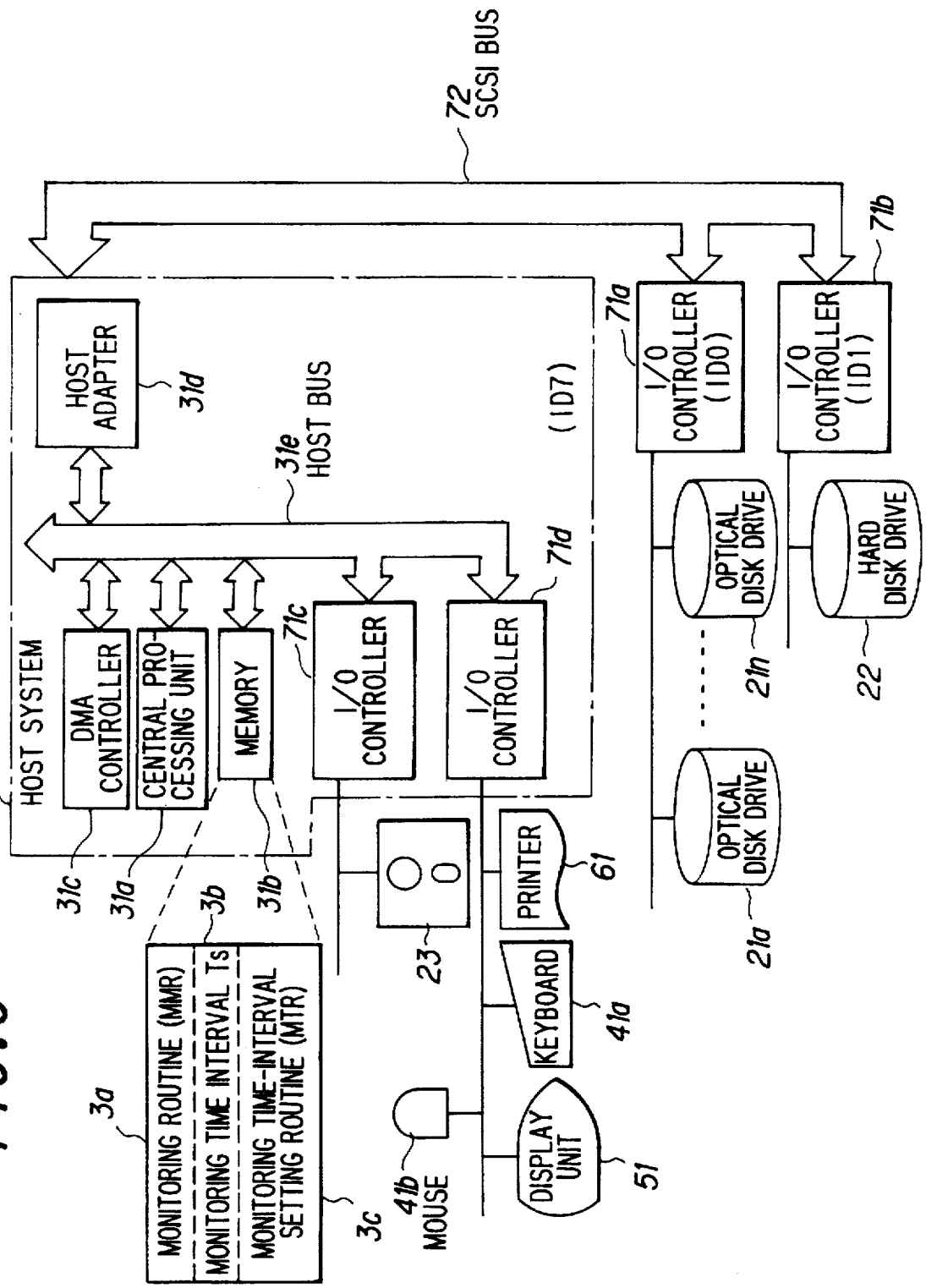
FIG. 3 is diagram showing the electrical construction of the system according to a first embodiment of the invention.

FIG. 3 is a diagram showing the electrical configuration of the computer system, in which portions identical with those shown in FIG. 2 are designated by like reference characters. Numerals 21a~21n denote optical disk drives, 22 a hard disk drive, 31 the host system, 71a~71b I/O controllers and 72 an SCSI (small computer system interface) bus. An SCSI is an interface that connects the main body of a computer with an external storage unit. The specifications of an SCSI are stipulated by the American National Standard Institute (ANSI). The SCSI bus 72 is composed of a data bus, which comprises eight bits and a parity bit, and nine control busses, by way of example. Up to a maximum of eight SCSI devices (a host computer, a disk drive controller, etc.) can be connected to the SCSI bus, and each device connected has an identification number, referred to as an "ID" (identifier), of from 0 to 7. In FIG. 3, identifiers ID0~ID1 are allocated to the I/O controllers 71a, 71b, respectively, and ID7 is allocated to the host computer 31. Though the hard disk drive 22 is connected to the I/O controller 71b, two or more drives can be connected.

The host system 31 includes a central processing unit (CPU) 31a, a memory 31b, a DMA controller 31c, a host adapter 31d and I/O controllers 71c, 71d, all of which are connected to a host bus 31e. The host system 31 uses a floppy disk drive 23, which is connected to the I/O controller 71c. The host system further includes a keyboard 41a, a mouse 41b, the display device 51 and the printer 61, all of which are connected to an I/O controller 71d.

The host system 31 and the I/O controllers 71a, 71b are interconnected by an SCSI interface, and the I/O controllers 71a and 71b are connected to the drives 21a~21n and 22, respectively, by ESDIs (enhanced small device interfaces), by way of example. In this system the optical disk drives 21a~21n and the hard disk drive 22 are separated from the host bus 31e, the SCSI bus 72 is provided separately of the host bus, the I/O controllers 71a, 71b for the drives are connected to this SCSI bus and the drives 21a~21n and 22 are controlled by the I/O controllers 71a and 71b, respectively, to lighten the burden upon the host bus.

The memory 31b of the host system 31 is provided with a medium-loading monitoring routine (MMR) 3a for performing monitoring at a prescribed monitoring time interval (examination period Ts) to determine whether an optical disk has been loaded in the optical disk drives 21a~21n, the monitoring time interval (Ts) 3b, and a monitoring time-interval setting routine (MTR) 3c for changing and setting the monitoring time interval Ts. Though the details are not illustrated, the number of optical disk drives connected to the computer system, loading information indicating whether an optical disk has been loaded in each drive, etc., are stored in the memory 31b.

(b) Monitoring time-interval setting routine

Figure 4:
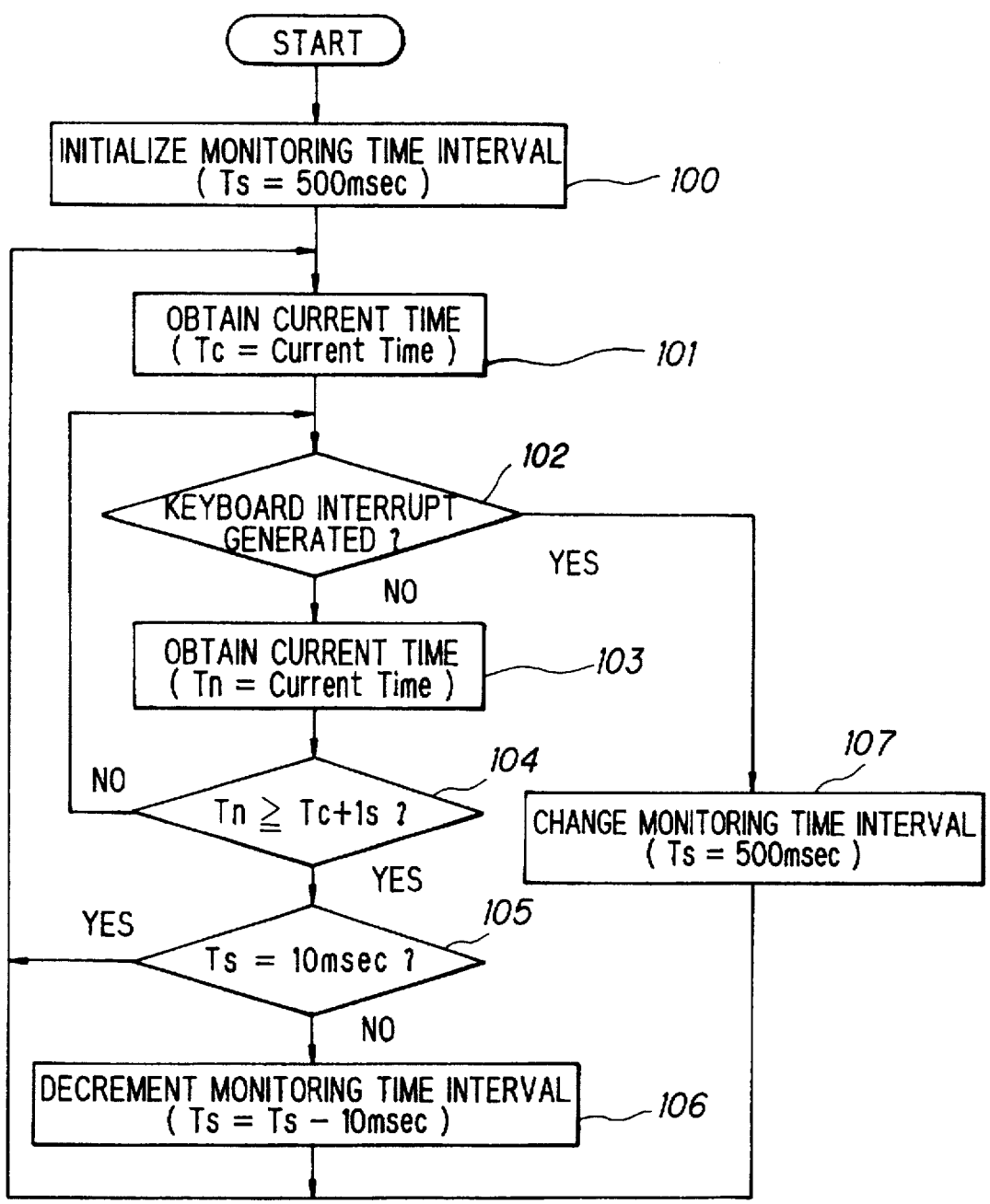
FIG. 4 is a flowchart showing a monitoring time-interval setting routine according to the first embodiment.

FIG. 4 is a flowchart illustrating the processing of the monitoring time-interval setting routine (MTR) 3c. This is for a case in which the monitoring time interval Ts is set based upon how frequently the keys on the keyboard 4a are being pressed by the user.

In order to arrange it so that the monitoring task influences other tasks little, initially 500 msec, for example, is set as the monitoring time interval Ts (step 100).

Next, the current time is obtained from a system clock and is set to an internal variable Tc (step 101). Thereafter, it is determined (step 102) whether a keyboard interrupt has been generated by pressing of key. If a keyboard interrupt has not been generated, then the current time is obtained and this is made as internal variable Tn (step 103).

Next, it is determined (step 104) whether the difference between the current times Tn and Tc is greater than 1 sec. If the difference is not greater than 1 sec, then processing from step 102 onward is repeated. If the difference between the current times Tn and Tc is greater than 1 sec, then it is determined (step 105) whether the monitoring time interval Ts is a minimum value (=10 msec). If Ts is not the minimum value, then Ts is reduced by 10 msec (i.e., the operation Ts−10→Ts is performed at step 106), then the program returns to step 101 and processing from step 101 onward is repeated. As a result, if frequency of key use is small, the monitoring time interval Ts is gradually reduced to the minimum value. If Ts=10 msec is found to hold at step 105, then the program returns to step 101 and processing from this step onward is repeated.

If the key interrupt is found to have been generated at step 102, then Ts is changed to the initial value (=500 msec) (step 107), irrespective of the value of the prevailing monitoring time interval Ts, and the program then returns to step 101 so that processing from this step onward is repeated. It should be noted that an arrangement can be adopted in which the monitoring time interval Ts is gradually increased to a maximum value (=500 msec).

The reason for controlling the monitoring time interval Ts in the manner described above is as follows: When the user is operating the keyboard 41a to enter data or commands, there is little likelihood that the optical disk 11 will be inserted into any of the optical disk drives 21a~21n. Moreover, the load on the host 31 is large at this time. Accordingly, when the keyboard interrupt is generated, the monitoring time interval Ts is restored to the maximum value or is gradually increased. On the other hand, when keyboard 41a is not being used, there is a good possibility that the user will insert the optical disk 11 into one of the optical disk drives 21a~21n. Moreover, the, load on the host 31 is small at this time. Accordingly, if there is no keyboard interrupt, i.e., if the keyboard is being used infrequently, the examination period is shortened.

In the foregoing, the monitoring time interval is controlled on the basis of keying of the keyboard. However, it can be so arranged that the monitoring time interval is controlled on the basis of switching (clicking) of the mouse or state of use of the data input unit.

(c) Monitoring routine

Figure 5:
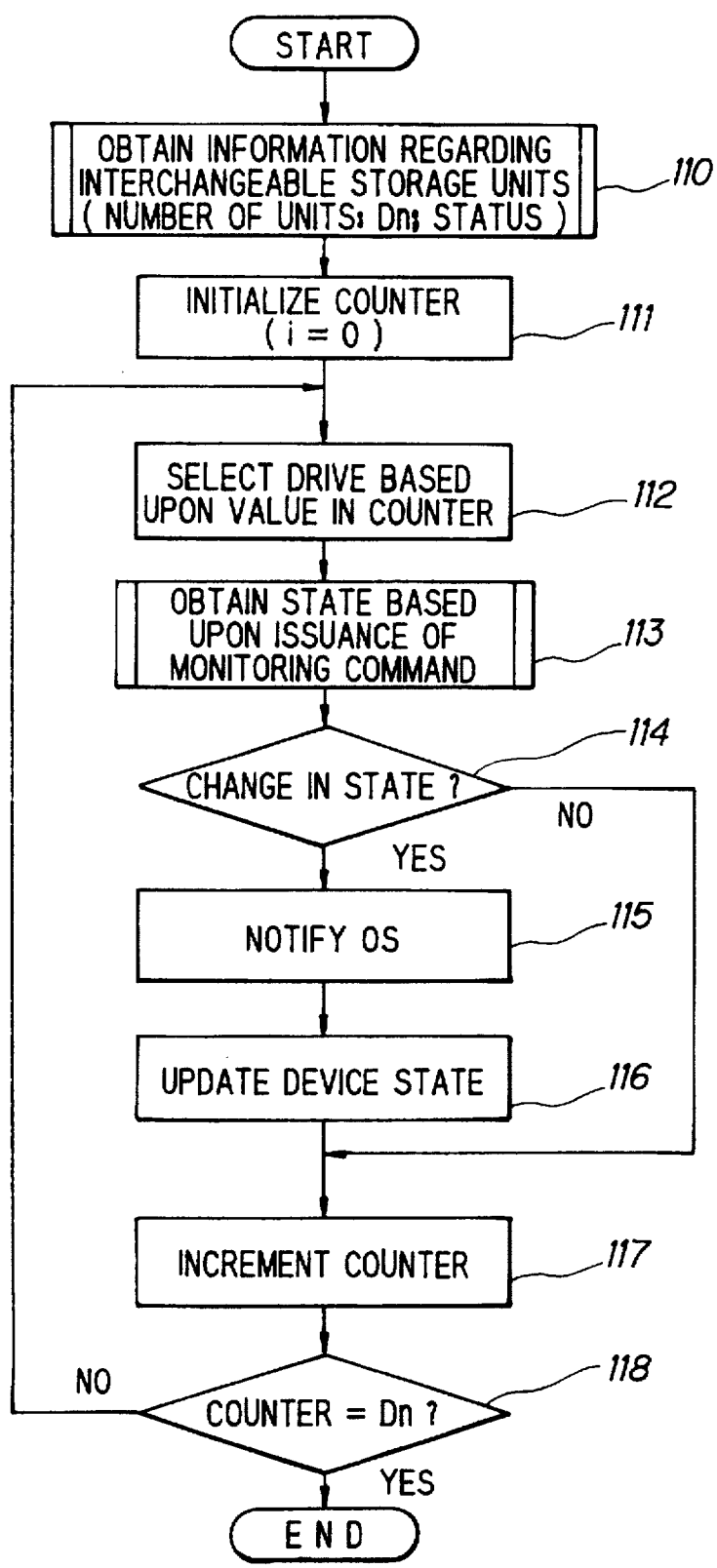
FIG. 5 is a flowchart showing a monitoring routine according to the first embodiment.

FIG. 5 is a flowchart showing the processing of the medium-loading monitoring routine (MMR) 3a.

When a timer interrupt is generated on the basis of the monitoring time interval Ts, the medium-loading monitoring routine 3a is executed.

First, the number Dn of optical disk drives connected to the computer system and loading information indicating whether an optical disk has been loaded in each drive are read out of the memory 31a (step 110). Next, a counter value i is set to 0 (step 111), after which a device for performing monitoring processing is selected in accordance with the value i counted by the counter (step 112). Next, a monitoring command is issued to obtain the present state of the device (namely the loading state of the medium) (step 113). In a case where the device has been connected through an SCSI, the monitoring command is a TEST UNIT READY command. The monitoring command may even be one such as an MS-DOS directory command. With regard to the determination as to whether or not a medium has been loaded, loading is judged to have taken place if the issued command ends normally and non-loading is judged to have taken place if the issued command ends abnormally. The currently prevailing loading state just acquired and the state acquired at step 110 are compared to determine whether a change in state has occurred (step 114).

If there has been a change in state, the OS (operating system) is so notified (step 115). Notification of the OS can be performed by communication with the device driver or by communication based upon an API (application program interface) or message. Furthermore, the OS executes a prescribed service with regard to an optical disk drive in which an optical disk has been loaded. For example, a predetermined program is read out of the optical disk and this program is executed.

Next, the new device state is stored in the memory 31a. Specifically, the content of the memory is updated (step 116), after which the value i of the counter is incremented (i+1→i at step 117). If no change in state is found at step 114, processing from this step onward is executed.

Next, it is determined whether the value i in the counter has become equal to the number Dn of devices connected to the computer system (step 119). If the two values are equal, then the medium-loading monitoring routine is terminated and the system waits for the next timer interrupt. If the two values are not equal, however, the program returns to step 112 and processing from this step onward is repeated.

In the foregoing, a change in loading state is examined in all of the optical disk drives. However, an arrangement may be adopted in which the optical-disk loading state is examined only with regard to optical disk drives in which optical disks have not been loaded.

Thus, as set forth above, it is so arranged that the time interval for monitoring loading state is changed based upon how frequently the user presses the keys on the keyboard, and the processing for monitoring loading is executed at this time interval. As a result, there is no decline in system throughput, loading of a recording medium can be discriminated immediately and the OS can be so notified.

(C) Second embodiment (a) Computer system configuration

Figure 6:
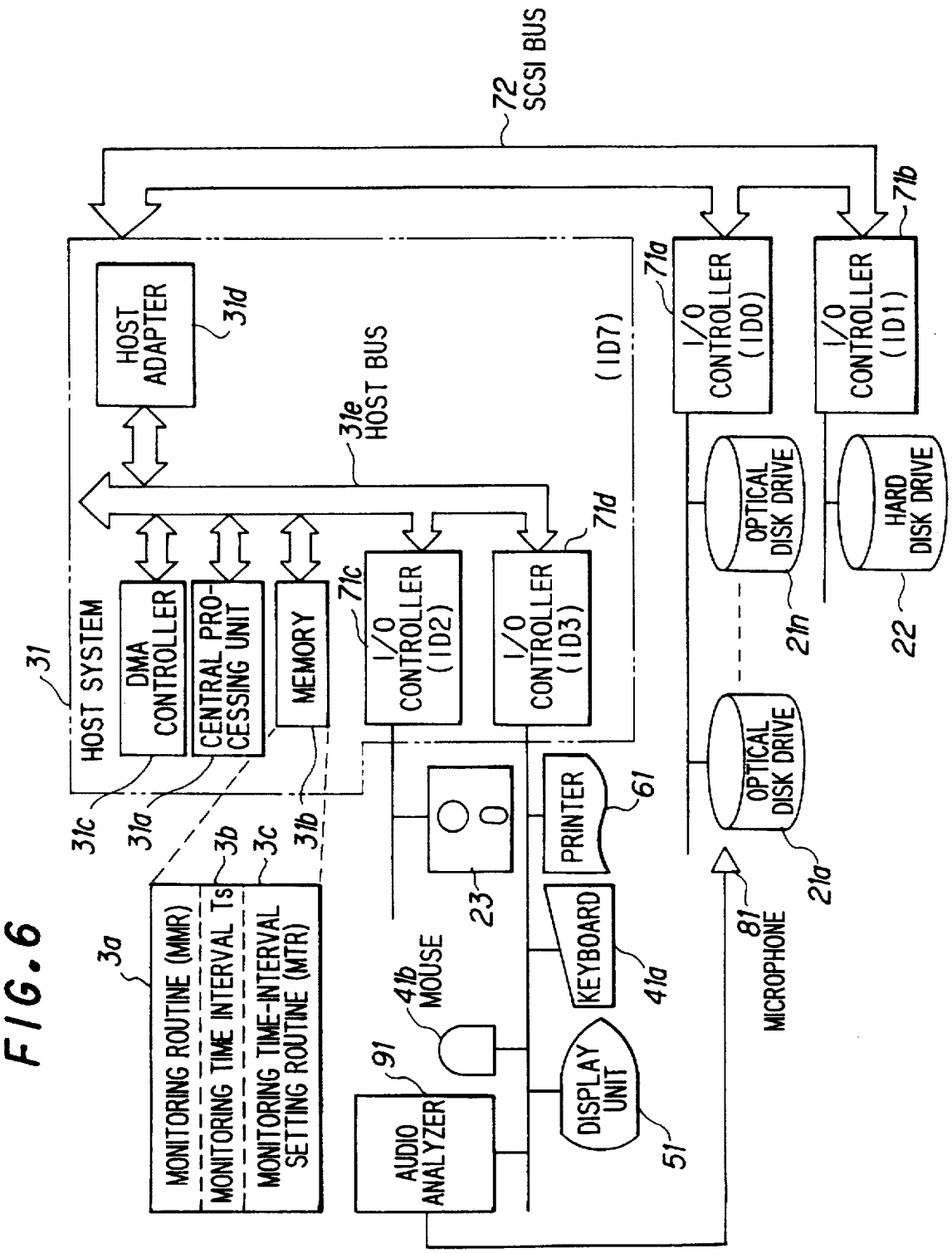
FIG. 6 is diagram showing the electrical construction of the system according to a second embodiment of the invention.

FIG. 6 is diagram illustrating the configuration of a computer system having an optical disk drive (interchangeable external storage unit) according to a second embodiment of the present invention. Components identical with those of the first embodiment shown in FIG. 3 are designated by like reference characters. FIG. 6 differs from FIG. 2 in provision of a microphone 81, which detects audio in the vicinity of the optical disk drives 21a~21n, and an audio analyzer 91. When an optical disk is loaded in an optical disk drive, a loading sound is produced. The audio analyzer 91, which has a memory in which a temporal change in the frequency pattern of the loading sound is registered in advance, compares the frequency pattern of the audio detected by microphone 81 with frequency pattern of the loading sound registered beforehand, thereby detecting whether an optical disk has been loaded. It should be noted that it is unnecessary for detection of loading to be performed at a probability of 100%; it will suffice if what appears to be loading of an optical disk can be detected.

(b) Monitoring time-interval setting routine

Figure 7:
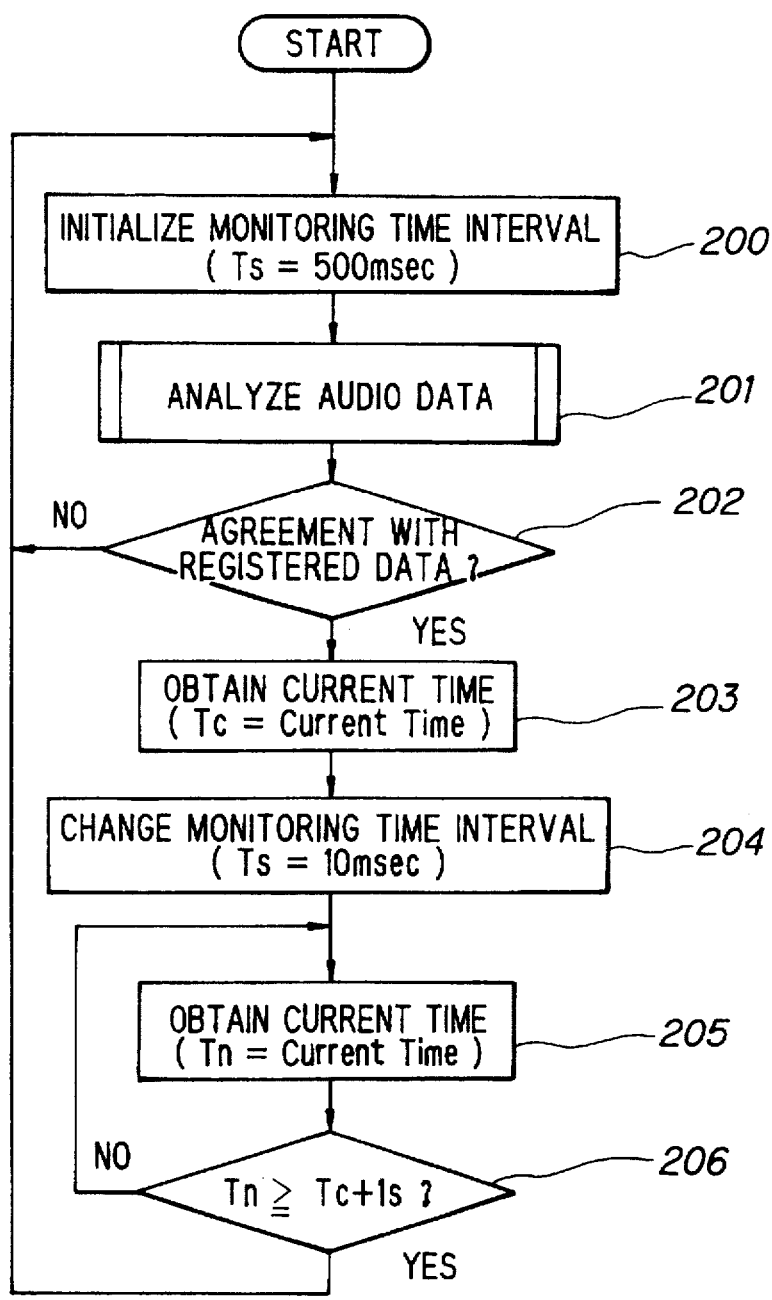
FIG. 7 is a flowchart showing a monitoring time-interval setting routine according to the second embodiment.

FIG. 7 is a flowchart illustrating the processing of the monitoring time-interval setting routine 3c. This is for a case in which the monitoring time interval Ts is shortened in response to detection of the loading sound.

In order to arrange it so that the monitoring task influences other tasks little, initially 500 msec, for example, is set as the monitoring time interval Ts (step 200).

Next, the frequency pattern of the audio detected by the microphone 81 is obtained and this pattern is compared with the registered frequency pattern of the loading sound (steps 201, 202). It should be noted that the audio which enters from the microphone 81 is digitized by PCM (pulse code modulation) in an audio processor (not shown) before being sent to the audio analyzer 91 as occasion demands.

If the two compared patterns are judged to be different, the program returns to step 200, from which processing is then repeated. If the two patterns are judged to agree, then the current time Tc is found from the system clock (step 203) and the monitoring time interval Ts is set to a time period shorter than the initial value, e.g., to a time period of 10 msec (step 205). Thereafter, the current time Tn is obtained from the system clock (step 205).

Next, it is judged whether the difference between the current times Tn and Tc is greater than 1 sec (step 206). If the answer is NO, then processing from step 205 onward is repeated. If the difference between the current times Tn and Tc is greater than 1 sec, the program returns to step 200, where the monitoring time interval Ts is restored to the initial value (=500 msec). Processing from this step onward is then repeated.

If the monitoring time interval Ts is decided and a timer interrupt is generated at this monitoring time interval through the above-described method, then the medium-loading monitoring routine 3a executes medium-loading monitoring processing in exactly the same manner as performed in the first embodiment of FIG. 5.

Thus, in accordance with the second embodiment, when a sound which agrees with pre-registered loading sound data is generated, the monitoring time interval Ts is shortened at this moment and monitoring of medium loading is carried out in more concentrated fashion for a prescribed time (e.g., 1 sec). As a result, there is no decline in system throughput, loading of a recording medium can be discriminated immediately and the OS can be so notified.

(D) Third embodiment

In a third embodiment, the medium-loading monitoring period is shortened in a case where a predetermined operation (a monitoring request operation) is performed using the keyboard. The diagram of the computer system configuration is identical with that of the first embodiment shown in FIG. 3.

Figure 8:
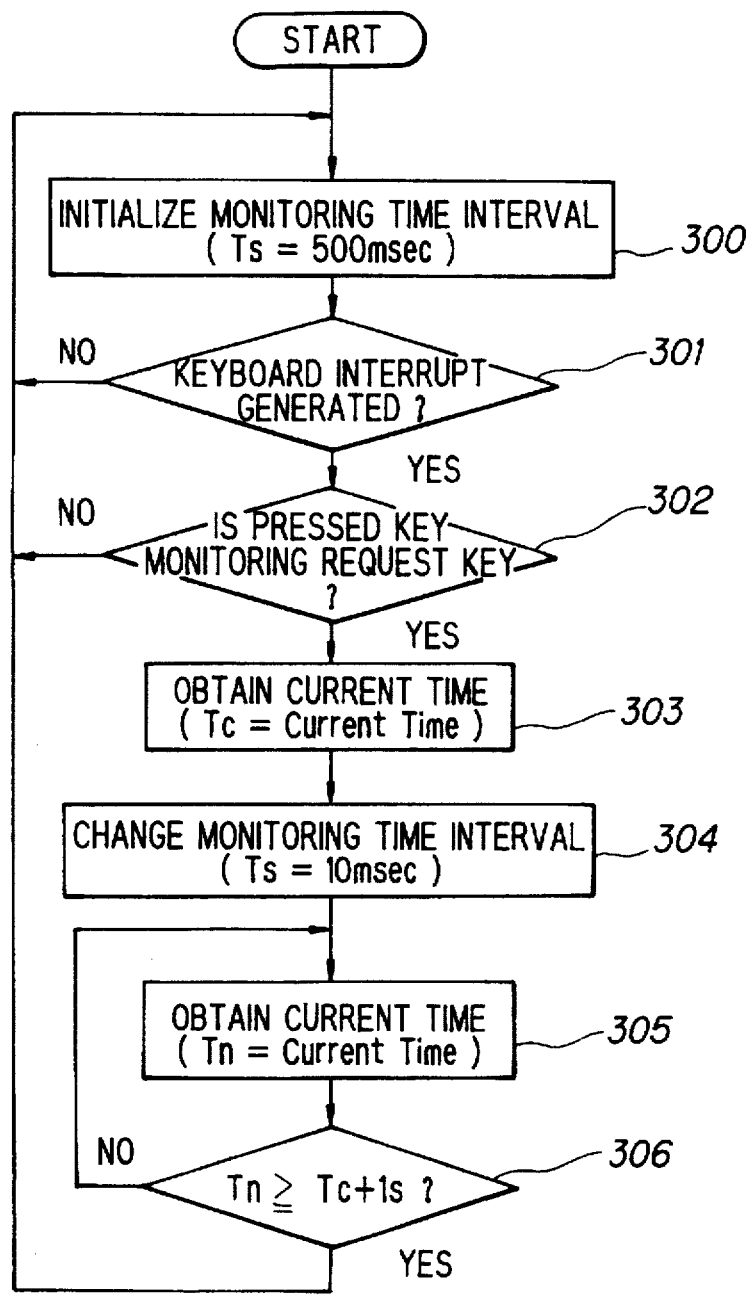
FIG. 8 is a flowchart showing a monitoring time-interval setting routine according to a third embodiment.

FIG. 8 is a flowchart illustrating the processing of the monitoring time-interval setting routine 3c.

In order to arrange it so that the monitoring task influences other tasks little, initially 500 msec, for example, is set as the monitoring time interval Ts (step 300). Next, it is determined (step 301) whether a keyboard interrupt has been generated by pressing of key. If a keyboard interrupt has not been generated, then the program returns to the beginning and processing is repeated.

On the other hand, if a keyboard interrupt has been generated by pressing of a key, it is determined (step 302)

whether the pressed key is a monitoring request key registered previously. The monitoring request key may be an ordinarily used key, a special key provided on the keyboard or a combination of a plurality of keys. If it is found at step 302 that the pressed key is not a monitoring request key, then the program returns to the beginning and processing is repeated. If the monitoring request key has been pressed, on the other hand, the current time Tc is obtained from the system clock (step 303) and the monitoring time interval Ts is set to a time period shorter than the initial value, e.g., to a time period of 10 msec (step 304). Thereafter, the current time Tn is obtained from the system clock (step 305).

Next, it is judged whether the difference between the current times Tn and Tc is greater than 1 sec (step 306). If the answer is NO, then processing from step 305 onward is repeated. If the difference between the current times Tn and Tc is greater than 1 sec, the program returns to step 300, where the monitoring time interval Ts is restored to the initial value (=500 msec). Processing from this step onward is then repeated.

If the monitoring time interval Ts is decided and a timer interrupt is generated at this monitoring time interval through the above-described method, then the medium-loading monitoring routine 3a executes medium-loading monitoring processing in exactly the same manner as performed in the first embodiment of FIG. 5.

Thus, in accordance with the third embodiment, when pre-registered monitoring request key is pressed, the monitoring time interval Ts is shortened at this moment and monitoring of medium loading is carried out in more concentrated fashion for a prescribed time (e.g., 1 sec). As a result, there is no decline in system throughput, loading of a recording medium can be discriminated immediately and the OS can be so notified.

(E) Fourth embodiment

In a fourth embodiment, the medium-loading monitoring period is shortened at the time of system start-up. The diagram of the computer system configuration is identical with that of the first embodiment shown in FIG. 3.

Figure 9:
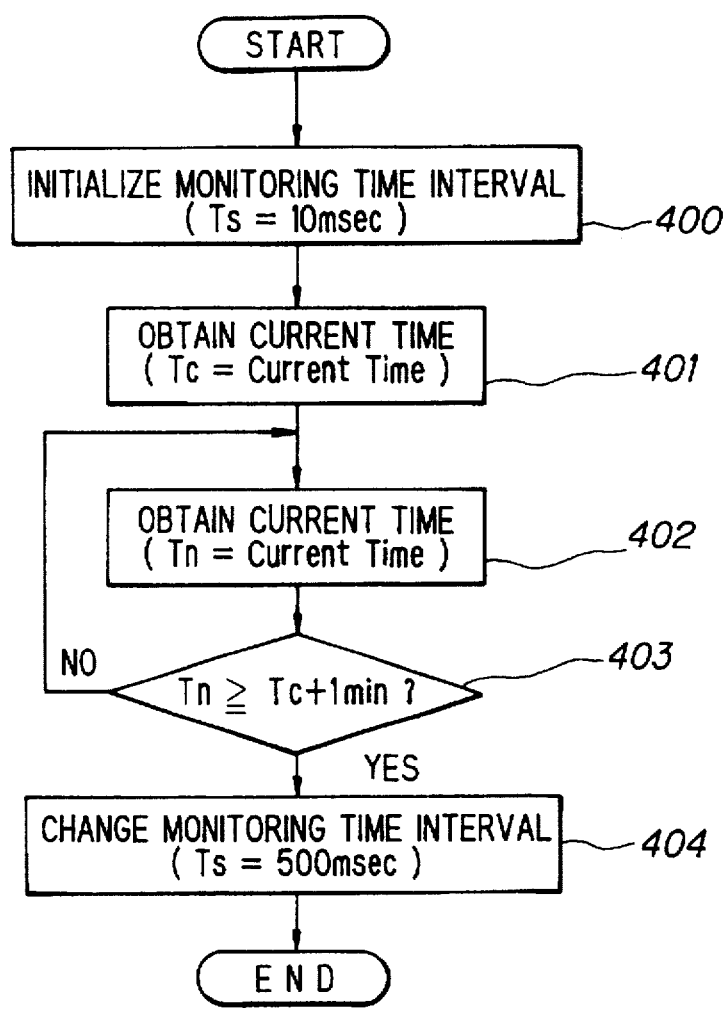
FIG. 9 is a flowchart showing a monitoring time-interval setting routine according to a fourth embodiment.

FIG. 9 is a flowchart illustrating the processing of the monitoring time-interval setting routine 3c.

At system start-up, a time interval for performing monitoring most frequently, e.g., 10 msec, is initially set as the monitoring time interval Ts (step 400). Next, the current time Tc is obtained from the system clock and is stored (step 401). Thereafter, the current time Tn is obtained from the system clock (step 402) and it is determined (step 403) whether the difference between the current times Tn and Tc is greater than 1 min. If the difference is not greater than 1 min, then processing from step 402 onward is repeated. If the difference between the current times Tn and Tc is greater than 1 min, then, in order to arrange it so that the monitoring task influences other tasks little, initially 500 msec, for example, is set as the monitoring time interval Ts (step 404).

If the monitoring time interval Ts is decided and a timer interrupt is generated at this monitoring time interval through the above-described method, then the medium-loading monitoring routine 3a executes medium-loading monitoring processing in exactly the same manner as performed in the first embodiment of FIG. 5.

Thus, in accordance with the fourth embodiment, the monitoring time interval Ts is shortened at system start-up and monitoring of medium loading is carried out in more concentrated fashion for a prescribed time (e.g., 1 min). As a result, there is no decline in system throughput, loading of a recording medium can be discriminated immediately and the OS can be so notified.

(F) Fifth embodiment

In a fifth embodiment, the period at which loading of a medium is monitored is decided on the basis of CPU load rate. The diagram of the computer system configuration is identical with that of the first embodiment shown in FIG. 3.

Figure 10:
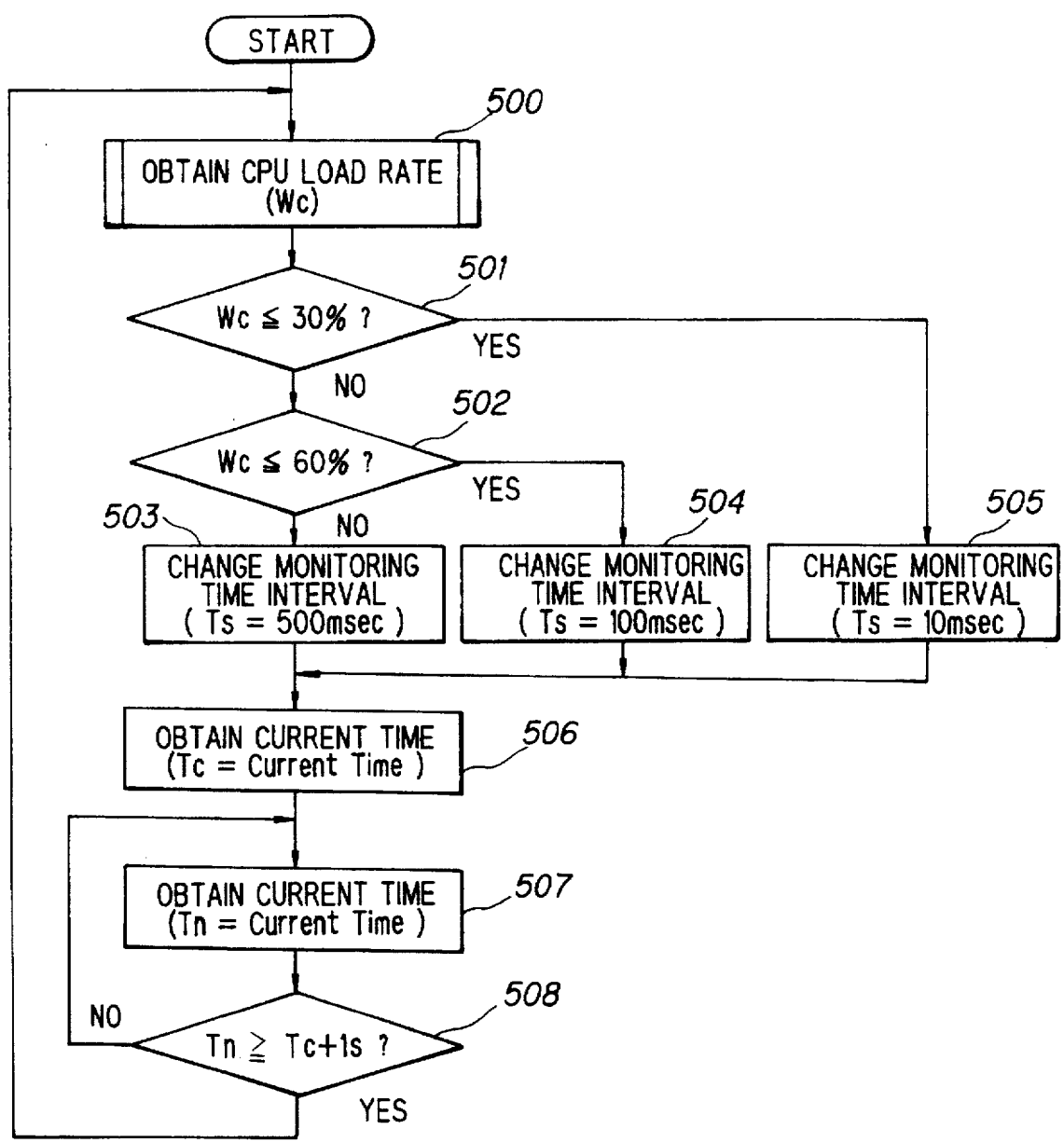
FIG. 10 is a flowchart showing a monitoring time-interval setting routine according to a fifth embodiment.

FIG. 10 is a flowchart illustrating the processing of the monitoring time-interval setting routine 3c.

The extent to which the CPU is being used per unit time is referred to as the load rate, which is represented by Wc. The load rate Wc is obtained by the API (application program interface) provided by the OS (step 500). Next, a span into which load rate Wc falls, e.g., a first span in which Wc is less than 30%, a second span in which Wc is 30–60% or a third span in which Wc is greater than 60%, is found (steps 501, 502).

The correspondence between spans and the monitoring time interval Ts is stored in the memory 31a beforehand. Therefore, the monitoring time interval Ts of the span into which the load rate falls is obtained from this corresponding relationship and is set (steps 503–505). It should be noted that Ts=500 msec, 100 msec and 10 msec in case of the third, second and first spans, respectively.

Next, the current time Tc is obtained from the system clock and is stored (step 506). Thereafter, the current time Tn is obtained from the system clock (step 507) and it is determined (step 508) whether the difference between the current times Tn and Tc is greater than 1 sec. If the difference is not greater than 1 sec, then processing from step 507 onward is repeated. If the difference between the current times Tn and Tc is greater than 1 sec., then the program returns to step 500 and subsequent processing is repeated on the basis of the new CPU load rate.

If the monitoring time interval Ts is decided and a timer interrupt is generated at this monitoring time interval through the above-described method, then the medium-loading monitoring routine 3a executes medium-loading monitoring processing in exactly the same manner as performed in the first embodiment of FIG. 5.

Thus, in accordance with the fifth embodiment, the monitoring time interval is lengthened, on the basis of the CPU load rate, when the computer is executing processing such as scientific and technological computations, by way of example. The monitoring time interval is shortened when the computer is not executing processing. Thus, loading of a recording medium can be monitored while reducing the effects on other tasks. As a result, loading of a recording medium can be discriminated without a decline in system throughput.

(G) Sixth embodiment

In a sixth embodiment, the period at which loading of a medium is monitored is decided on the basis of CPU load rate and keyboard interrupt. The diagram of the computer system configuration is identical with that of the first embodiment shown in FIG. 3.

Figure 11:
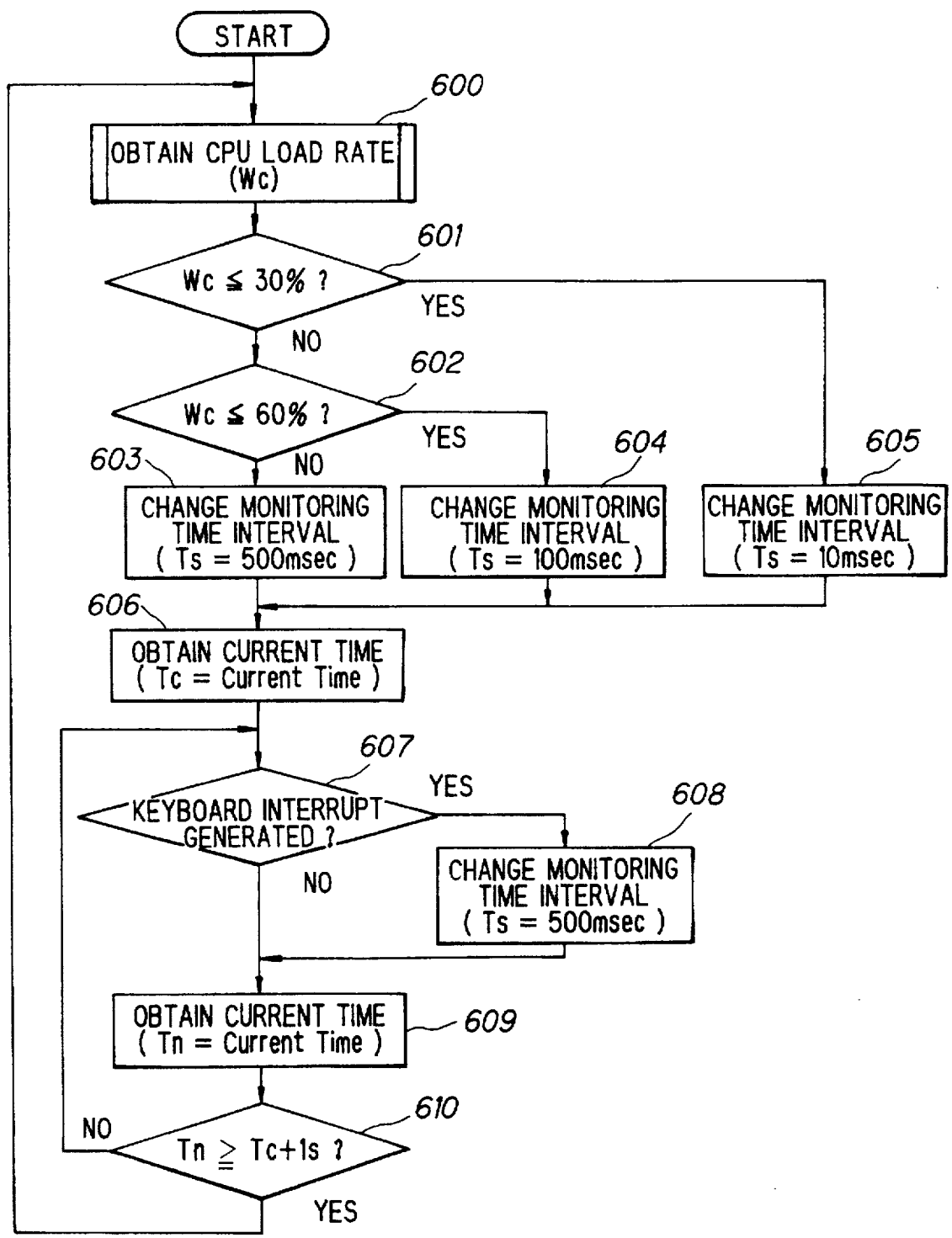
FIG. 11 is a flowchart showing a monitoring time-interval setting routine according to a sixth embodiment.

FIG. 11 is a flowchart illustrating the processing of the monitoring time-interval setting routine 3c.

As mentioned above, the extent to which the CPU is being used per unit time is referred to as the load rate Wc. The load rate Wc is obtained by the API provided by the OS (step 600). Next, a span into which load rate Wc falls, e.g., a first span in which Wc is less than 30%, a second span in which Wc is 30–60% or a third span in which Wc is greater than 60%, is found (steps 601, 602). The monitoring time interval Ts of the span into which the load rate falls is obtained from the corresponding relationship between the span and the monitoring time interval Ts, and monitoring time interval Ts obtained is set (steps 603–605).

Next, the current time Tc is obtained from the system clock and is stored (step 606). Thereafter, it is determined whether a keyboard interrupt has been generated by pressing of a key on the keyboard by the user (step 607). If an interrupt has been generated, then the monitoring time interval Ts is changed to, say, 500 msec. to reduce the influence of the monitoring task on other tasks (step 608). If a keyboard interrupt has not been generated, then the time set at steps 603–605 is maintained as the monitoring time interval Ts.

Next, the current time Tn is obtained from the system clock (step 609) and it is determined (step 610) whether the difference between the current times Tn and Tc is greater than 1 sec. If the difference is not greater than 1 sec, then processing from step 607 onward is repeated. If the difference between the current times Tn and Tc is greater than 1 sec, then the program returns to step 600 and subsequent processing is repeated on the basis of the new CPU load rate.

If the monitoring time interval Ts is decided and a timer interrupt is generated at this monitoring time interval through the above-described method, then the medium-loading monitoring routine 3a executes medium-loading monitoring processing in exactly the same manner as performed in the first embodiment of FIG. 5.

Thus, in accordance with the sixth embodiment, the monitoring time interval is lengthened when the CPU load rate is high (e.g., when the computer is executing processing such as scientific and technological computations) or when the user is using the keyboard. This makes it possible to reduce the influence upon other tasks. The monitoring time interval is shortened when the CPU load rate is low or when the keyboard is not being used. As a result, loading of a recording medium can be discriminated in a short time.

In the embodiments set forth above, a case is described in which an optical disk serves as the recording medium and an optical disk drive as the interchangeable external storage unit. However, this does not impose a limitation upon the invention, which can be applied to floppy disks and floppy disk drives.

Thus, in accordance with the present invention as described above, the time intervals at which loading of a recording medium is monitored can be varied based upon the state of use of a data input unit. As a result, there is no decline in system throughput and loading of a recording medium can be discriminated immediately.

Further, in accordance with the invention, the monitoring time interval is shortened only when it is highly likely that a recording medium has been loaded. This makes it possible to discriminate loading of a recording medium promptly and to prevent a decline in system throughput.

Further, in accordance with the invention, the monitoring time interval is shortened when the CPU load rate of the host is low and is lengthened when the CPU load rate is high. This makes it possible to discriminate loading of a recording medium while preventing a decline in throughput of the overall system.

As many apparently widely different embodiments of the present invention can be made without departing from the spirit and scope thereof, it is to be understood that the invention is not limited to the specific embodiments thereof except as defined in the appended claims.

What is claimed is:

1. A method of controlling a computer system having an external storage unit in which a storage medium can be loaded and unloaded, a host apparatus which executes prescribed processing on the basis of software that has been stored on the storage medium, a medium-loading monitoring means and an input unit for entering data and commands, which are necessary for processing, into the host apparatus, wherein said host apparatus executes predetermined processing upon detecting that the storage medium has been loaded in said external storage unit, said method comprising the steps of:

monitoring state of use of the input unit;

examining an external storage unit to determine whether a storage medium has been loaded; and commanding a medium loading monitoring means, in conformity with the state of use of said input unit, to change a period at which an examination is performed.

2. The method according to claim 1, wherein said input unit is a keyboard or a mouse and state of use of said input unit is ascertained by monitoring the frequency of operation of keys on the keyboard or switching operation of the mouse; and the examination period is lengthened if frequency of use of the input unit is high and shortened if frequency of use of the input unit is low.

3. The method according to claim 1, further comprising a step of executing examination of storage medium loading solely with regard to external storage units in which a storage medium has not been loaded in a case where a plurality of external storage units have been connected to said computer system.

4. The method according to claim 1, further comprising the steps of:

setting, at system start-up, a period at which an examination is performed to determine whether a storage medium has been loaded in the external storage unit; and lengthening, upon elapse of prescribed time from system start-up, the period at which the examination is performed to determine whether the storage medium has been loaded in the external storage unit.

5. The method according to claim 1, further comprising a step of executing examination of storage medium loading solely with regard to external storage units in which a storage medium has not been loaded in a case where a plurality of external storage units have been connected to said computer system.

6. A method of controlling a computer system having an external storage unit in which a storage medium can be loaded and unloaded and a host apparatus which executes prescribed processing on the basis of software that has been stored on the storage medium, wherein said host apparatus executes predetermined processing upon detecting that the storage medium has been loaded in said external storage unit, said method comprising the steps of:

providing means for registering a loading sound produced when a storage medium is loaded in an external storage unit and a microphone;

judging whether a sound detected by said microphone is the loading sound by comparing the detected sound with the registered sound; and if the detected sound is judged to be the loading sound, shortening a period at which an examination is performed to determine whether a storage medium has been loaded in the external storage unit.

7. A method of controlling a computer system having an external storage unit in which a storage medium can be loaded and unloaded, a host apparatus which executes prescribed processing on the basis of software that has been stored on the storage medium, and an input unit for entering data and commands, which are necessary for processing, into the host apparatus, wherein said host apparatus executes predetermined processing upon detecting that the storage medium has been loaded in said external storage unit, said method comprising the steps of:

examining an external storage unit at predetermined periods to determine whether a storage medium has been loaded in the external storage unit;

monitoring whether a predetermined operation has been performed by said input unit; and if the predetermined operation has been performed, shortening said period at which examination is performed to determine whether a storage medium has been loaded in the external storage unit.

8. A computer system having an external storage unit in which a storage medium can be loaded and unloaded, a host apparatus which executes prescribed processing on the basis of software that has been stored on the storage medium, and an input unit for entering data and commands, which are necessary for processing, into the host apparatus, wherein said host apparatus executes predetermined processing upon detecting that the storage medium has been loaded in said external storage unit, said computer system comprising:

monitoring means for monitoring state of use of an input unit; and examination-period changing means for changing, in conformity with the state of use of said input unit, an examination period at which an examination is performed to determine whether the storage medium has been loaded in the external storage unit.

9. A host apparatus for executing processing conforming to data and commands, which have been entered from an input unit, on the basis of software that has been stored on a storage medium, and for executing predetermined processing upon detecting that the storage medium has been loaded in an external storage unit, said host apparatus comprising:

monitoring means for monitoring state of use of the input unit;

examination-period changing means for changing, in conformity with the state of use of said input unit, an examination period at which an examination is performed to determine whether the storage medium has been loaded in the external storage unit; and medium-loading monitoring means for performing monitoring to determine whether the storage medium has been loaded in the external storage unit.

\* \* \* \* \*